US008972482B2

(12) United States Patent
Li et al.

(10) Patent No.: US 8,972,482 B2
(45) Date of Patent: Mar. 3, 2015

(54) AUTOMATED REMOTE SITE DOWNLOADING ON A GEOGRAPHIC DRIVE

(75) Inventors: Jun Li, Plainsboro, NJ (US); Junbiao Zhang, Bridgewater, NJ (US); Snigdha Verma, Somerset, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1125 days.

(21) Appl. No.: 10/591,556

(22) PCT Filed: Mar. 12, 2004

(86) PCT No.: PCT/US2004/007653
§ 371 (c)(1),
(2), (4) Date: Aug. 31, 2006

(87) PCT Pub. No.: WO2005/099224
PCT Pub. Date: Oct. 20, 2005

(65) Prior Publication Data
US 2007/0198674 A1    Aug. 23, 2007

(51) Int. Cl.
*G06F 15/16* (2006.01)
*H04L 29/08* (2006.01)

(52) U.S. Cl.
CPC ............. *H04L 67/06* (2013.01); *H04L 67/2847* (2013.01); *H04L 67/2814* (2013.01);
(Continued)

(58) Field of Classification Search
CPC ............ H04L 67/2842; H04L 67/2814; H04L 67/2817
USPC ........................................................ 709/203
See application file for complete search history.

(56) References Cited

U.S. PATENT DOCUMENTS 5,950,203 A * 9/1999 Stakuis et al. ................. 1/1
6,377,974 B1 * 4/2002 Feigenbaum ................ 709/203
(Continued)

FOREIGN PATENT DOCUMENTS

WO    WO 01/31445 A1    5/2001
WO    WO 01/52198 A2    7/2001
(Continued)

OTHER PUBLICATIONS

Apostolopoulos et al. Video streaming: Concepts, Algorithms, and Systems, HP, 2002, retrieved from the internet <URL: hpl.hp.com/techreports/2002/HPL-2002-260.pdf>, pp. 1-37 as printed.*
(Continued)

*Primary Examiner* — Michael Chao
(74) *Attorney, Agent, or Firm* — Robert D. Shedd; Wan Yee Chaung (57) ABSTRACT

A remote site downloading system is disclosed in which a local computer establishes a session with a content server, and a content file and geographic destination drive are selected. The local computer is typically on a first access network and the user wishes to have the file downloaded to a geographic drive, i.e., a remote site computer whose location and other properties are mapped in a mapping file on the local computer. The geographic drive is usually on a different access network in a dynamic location such as a hotspot or a fixed location such as broadband cable or DSL. The local computer is specially programmed to allow selection of the geographic target drive, pack information comprising cookies and a URL, and sends it to the remote geographic drive computer, where it may act as a proxy to cause downloading from the content server to the geographic drive on the remote site computer.

24 Claims, 8 Drawing Sheets

(52) U.S. Cl.
CPC .............. *H04L67/14* (2013.01); *H04L 67/04* (2013.01); *H04L 67/02* (2013.01); *H04L 67/2842* (2013.01); *H04L 67/142* (2013.01); *H04L 67/289* (2013.01); *H04L 69/329* (2013.01)
USPC ........................................................ 709/203

(56) References Cited

U.S. PATENT DOCUMENTS

| | | | | |
|---|---|---|---|---|
| 6,507,727 | B1 * | 1/2003 | Henrick | 455/3.06 |
| 6,615,276 | B1 * | 9/2003 | Mastrianni et al. | 709/250 |
| 6,639,615 | B1 * | 10/2003 | Majumdar et al. | 715/839 |
| 6,672,775 | B1 * | 1/2004 | Narayanaswami | 709/219 |
| 6,697,944 | B1 * | 2/2004 | Jones et al. | 713/168 |
| 6,754,710 | B1 * | 6/2004 | McAlear | 709/227 |
| 6,874,017 | B1 | 3/2005 | Inoue et al. | |
| 6,934,735 | B1 * | 8/2005 | Emens et al. | 709/203 |
| 6,947,992 | B1 * | 9/2005 | Shachor | 709/228 |
| 6,959,285 | B2 * | 10/2005 | Stefanik et al. | 705/26 |
| 7,043,456 | B2 * | 5/2006 | Lindskog et al. | 705/76 |
| 7,113,981 | B2 * | 9/2006 | Slate | 709/217 |
| 7,277,942 | B2 | 10/2007 | Inoue et al. | |
| 7,299,271 | B2 | 11/2007 | Sato | |
| 7,698,364 | B2 * | 4/2010 | Andrew et al. | 709/204 |
| 2001/0055951 | A1 * | 12/2001 | Slotznick | 455/41 |
| 2002/0032731 | A1 * | 3/2002 | Qian et al. | 709/204 |
| 2002/0107904 | A1 * | 8/2002 | Talluri et al. | 709/202 |
| 2002/0133824 | A1 * | 9/2002 | Mensch | 725/62 |
| 2002/0164973 | A1 | 11/2002 | Edwards et al. | |
| 2002/0178211 | A1 * | 11/2002 | Singhal et al. | 709/201 |
| 2003/0069964 | A1 * | 4/2003 | Shteyn et al. | 709/225 |
| 2003/0114138 | A1 | 6/2003 | Li et al. | |
| 2003/0177196 | A1 * | 9/2003 | Bhasin et al. | 709/213 |
| 2004/0049673 | A1 * | 3/2004 | Song et al. | 713/150 |
| 2004/0147251 | A1 * | 7/2004 | Nakayama et al. | 455/414.2 |
| 2005/0066037 | A1 * | 3/2005 | Song et al. | 709/227 |
| 2007/0089110 | A1 | 4/2007 | Li | |
| 2008/0235360 | A1 | 9/2008 | Li et al. | |

FOREIGN PATENT DOCUMENTS

| | | |
|---|---|---|
| WO | WO 03/034286 | 4/2003 |
| WO | WO 03/052610 A1 | 6/2003 |

OTHER PUBLICATIONS

Egan, Erotica Inc., Oct. 23, 2000, N.Y. Times, Retrieved from the Internet <URL: nytimes.com/2000/10/23/us/erotica-special-report-technology-sent-wall-street-into-market-for-pornography.html>, pp. 1-8 as printed.*
Kathy Ivens; The Magic of Drive Mapping; 2003; Retrieved from the Internet <URL: windowsitpro.com/security/magic-drive-mapping>; pp. 1-5 as printed.*
Search Report dated Nov. 25, 2004.
JP Laid-Open Appln. 2003-271484, Sep. 26, 2003, CEC Co., Ltd.
JP Laid-Open Appln. 2003-177996, Jun. 27, 2003, NEC Corp.
JP Laid-Open Appln. 2000-276425, Oct. 6, 2000, Kabushiki Kaisha Toshiba.
Warabino, Takayuki et al., "Proposal of a device handoff method for seamless communications", IPSJ SIG Technical Reports, Information Processing Society of Japan, Nov. 14, 2003, vol. 2003, No. 114, pp. 105-112.
softbank Publishing, Inc., "Download from a Website with Downloader Countermeasurel, Enemy of Downloadersll, Break through the Countermeasure Site and Pull out by the Roots", NetRunner, vol. 5, No. 9, Sep. 1, 2003, pp. 30-31.
Softbank Publishing, Inc., "Pulling Out Treasures Found Outside by a Home Line!", NetRunner, vol. 5. No. 12, Dec. 1, 2003, pp. 50-51.
Takasugi et al., "The Technology for Seamless and Continuous Services in the Ubiquitous Network Environment", NTT Technical Journal, vol. 15, No. 6, The Telecommunications Association, Jun. 1, 2003, pp. 66-69.

* cited by examiner

AUTOMATED REMOTE SITE DOWNLOADING ON A GEOGRAPHIC DRIVE

BACKGROUND OF THE INVENTION

This application claims the benefit, under 35 U.S.C. §365 of International Application PCT/US2004/007653, filed Mar. 12, 2004, which was published in accordance with PCT Article 21(2) on Feb. 3, 2005 in English.

Downloading service systems having a triangular model consisting of a content requester, a content server, and a content consumer have been proposed. In such systems, content requests typically at one location pass to a content server for delivery to another location where the content consumer is. One of the problems with the prior art systems is that they do not provide session transfer so that a session established between the content requester and the content server is not easily transferred to the content consumer. Another problem with the prior art systems is that they do not allow efficient selection of the content consumer to which the requested file is to be downloaded. Prior triangular models require a business relationship between the local access network and the remote access network, which is often not practical, which therefore prevents use of such models.

SUMMARY OF THE INVENTION

The present invention addresses these problems and others as will become apparent from the following disclosure by providing in one aspect a method for remote site downloading (RSD) comprising establishing a session between a local computer and a content server having a URL; selecting a content file to be downloaded from the content server; selecting a remote site geographic drive to which the content file is to be downloaded from the content server; receiving at least one cookie of the session; packing information comprising the cookie of the session and the URL; and sending the packed information to a remote site computer; wherein the remote site computer uses the packed information to download the selected content file to the selected geographic drive.

In another aspect, the invention comprises a system for RSD comprising a local computer adapted for enabling selection of a geographic drive and for packing information comprising a session cookie and a URL and sending the packed information to a remote site computer for automatic downloading of a content file selected during a session between the computer and the content server.

Another aspect of the invention comprises a plug-in program for a web browser to be employed on a local computer, the plug-in program enabling transfer of a content requesting session between the local computer and a content web server by packing information comprising one or more cookies received on the local computer from the content web server and a URL for the requested file on the content web server, and sending the packed information by instant messenger, an e-mail with the information attached, or an HTTP request.

The programming in the local computer, which enables session transfer to a selected geographic drive of a downloading request, is another aspect of the invention.

The local computer preferably has an RSD program such as a special plug-in for a conventional web browser, the special program functioning to allow selection of a geographic drive as the destination drive to which the content file is to be downloaded, and also functioning to pack information comprising cookies and a URL and sending it to the geographic drive remote computer.

When the local computer has established a session with the content server and has requested delivery of a content file, the content server will usually require authentication such as by way of user id and password, as well as some form of payment such as a credit or debit card number or payment service such as PayPal, for example. As information is provided to the content server, the content server will usually send one or more cookies to the local computer to identify the session with the local computer. The RSD program will pack any such cookies and send them to the computer having the geographic drive selected at the local computer. The packed information can alternatively be sent to a remote computer such as a home computer or workplace computer. The packed information is used for another RSD program on the remote computer to download the content file or optionally the packed information may comprise an RSD program to be executed on the remote site computer to automatically download the content file, which was requested on the first local computer.

"Geographic drive" or "G-drive," refer to a computer storage means which is identified with the assistance of a G-drive mapping file which was previously created with user input and is stored in or accessable by the local client computer. The geographic drive comprises location-dependent storage on a local computer determined according to a map containing data that includes one or more of the following: a name of an associated network, a user ID of the associated access network, a password of the associated access network, a geographical location of a static location or a dynamic hotspot location, and an RSD assignment command comprising executables and parameters to be made when the geographic drive is accessed. The geographic drive map will often provide the address, user ID, password, geographical location, and the RSD assignment command.

In some cases the G-drive map will comprise travel plan data, including information such as airports and flights, which are used to calculate the access point where the user is expected to be at the desired time of downloading of the requested content file.

The geographic drive can be associated to a fixed or a dynamic access network. Examples of a fixed access network include a DSL or cable broadband network connecting to a home computer, either a desktop or laptop. Examples of dynamic access networks are hotspot WLANs at, for examples, a coffee shop, airport, or public access site. A cellular network is another form of dynamic access network, but a cellular connection is usually slower or more expensive to use than a WLAN or home DSL or cable, and therefore it is assumed that the cellular connection will be most often the first access network over which the content file is requested, and the other type of access networks will be the second type over which the content file is delivered.

The dynamic or fixed access networks may also have a cache server, which receives the packed information and downloads the content file, and then delivers it to a mobile computer geographic drive such as a laptop or Personal Data Assistant (PDA), when the mobile computer signs on or handshakes with the cache server. The cache server in such embodiments will typically execute a program, which utilizes the URL of the content file and the session cookies and cause the downloading of the content file to cache for delivery to the mobile computer geographic drive.

The session between the local computer and the content server is usually a secured session wherein the content file is purchased and the content server uses session control cookies to assure the downloading request is authentic.

The local computer will most often use a web browser with the RSD plug-in of the invention to establish the session with the content server.

The content files, which are larger and take longer to download are the type for which this invention provides the most advantages. For example, multimedia files such as movie files will usually take too long to download over a cellular network, but do not take too long to select and order. Thus, a cellular telephone user or a PDA user will often find it convenient to browse available content files to find, select, and purchase a movie, but find it very inconvenient to actually download the movie over the cellular network. The present invention makes it very convenient to select a preferred downloading location since all of the needed downloading location information is already stored, using the aforementioned geographic drive method and system.

DETAILED DESCRIPTION

Figure 1:
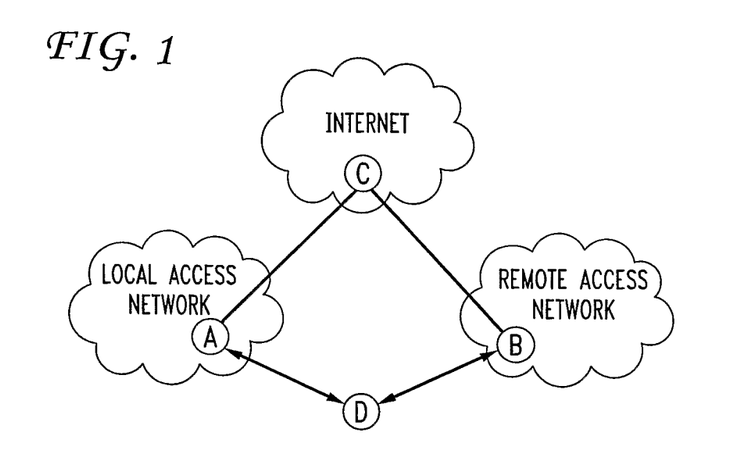
FIG. 1 illustrates an embodiment of a system architecture comprising a local computer D, a local access network A, the Internet C, and a remote access network B.

FIG. 1 illustrates an embodiment of a triangular system architecture comprising a local computer, D, a local access network, A, the Internet, C, and a remote access network, B. There is no business relationship between the local access network and the remote access network in this embodiment. The local computer, D, in the illustrated embodiment is a mobile computer such as a laptop, a Personal Data Assistant (PDA), or a cellular telephone with web access. The local access network can be the cellular provider of Internet access such as Verizon Wireless, Sprint wireless, or Cingular for example.

Figure 2:
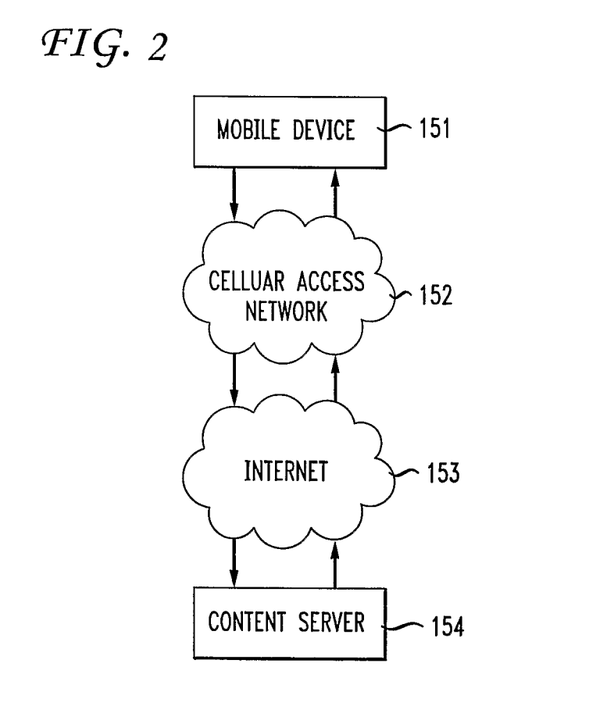
FIG. 2 depicts a network architecture showing the manner in which a mobile device communicates through a local access network to a content provider web site.

FIG. 2 depicts a network architecture showing a mobile device 151 (for example, a lap top computer or PDA) using a cellular access network, 152, (e.g., the Verizon Wireless network) to select a content server 154, (e.g. movies-site.com). Upon selecting the content server 154, the user then selects a content file, (e.g., Terminator-5, which is a movie file), for delivery to a selected G-drive (not shown).

The up arrows in FIG. 2 represent information sent to the mobile device 151 which comprise not only web page graphical user interface data, but cookies and URL's linking to the selected Terminator-5 movie.

Figure 3:
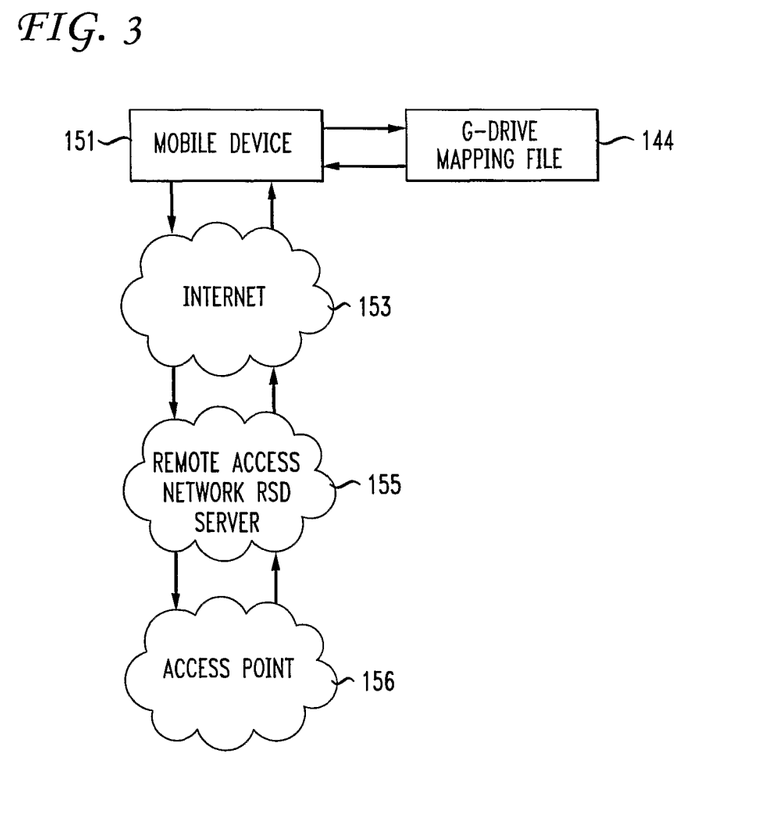
FIG. 3 depicts a network architecture illustrating a mobile device sending packed information to a remote access site RSD server that determines an access point based on a G-drive mapping file, and then passes the information to access point.

FIG. 3 illustrates a network architecture showing the mobile device 151 looking up a G-drive mapping file 144 which as described in greater detail below, defines a geographic storage location (referred to as a "G-Drive), either an actual or virtual location, for receiving downloaded content. After looking up the G-drive mapping file 144, the mobile device 151 sends a message, typically an Instant Messenger Service (IMS) message, to a remote access Remote Side Downloading (RSD) Server 155 that forwards the message to a local access network access point 156 (e.g., "Hotspot #555-1212"). In this process, the RSD server 155 establishes the location of the access point 156 based on mapped data, geographical coordinates, and/or user itinerary information (flight data, for example). Then the RSD server sends the URL and cookies to a cache server (not shown) close to the access point, 156. The cache server downloads the movie from the content server (e.g., content server 154 of FIG. 2) and awaits arrival of the mobile device 151. Upon access and authentication of the mobile device user 151, the access point 156 will down load the movie to the mobile device.

Figure 4:
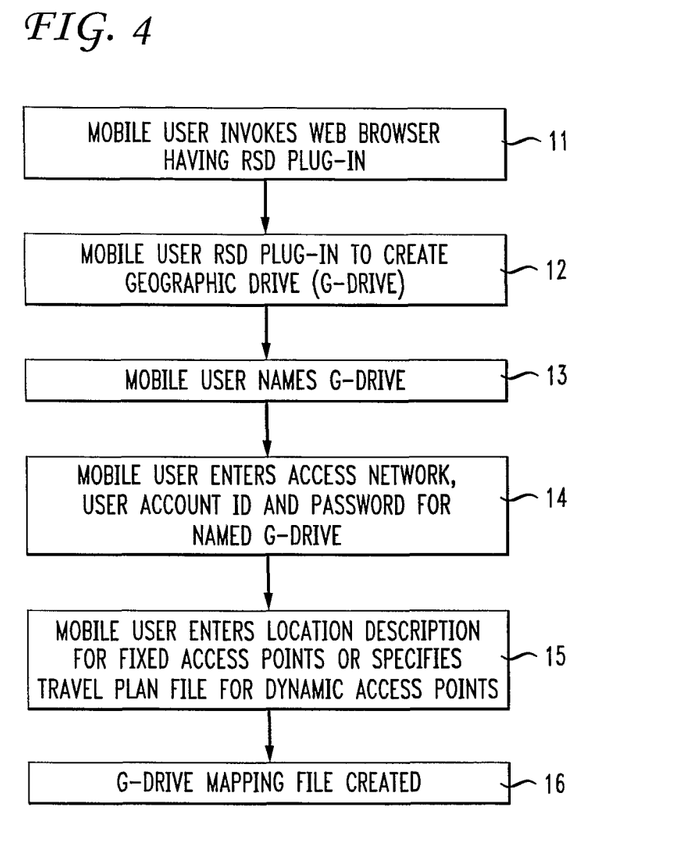
FIG. 4 illustrates in flow chart form a process flow chart for dynamically creating a G-drive.

FIG. 4 depicts in flow chart form the steps of the method in accordance with a preferred embodiment wherein the mobile device 151 of FIGS. 2 and 3 accesses a local access network (e.g., the cellular access network 152 of FIG. 2) and creates the G-drive mapping file 144 of FIG. 3. The cellular access network 152 of FIG. 2 typically provides a connection to the Internet 153 of FIG. 2. Further, the mobile device 151 of FIG. 1 has a web browser with a special remote side downloading (RSD) plug-in. The method depicted in FIG. 4 commences upon the selection of a media file, prompting the invoking of an RSD plug-in during step 11. The RSD plug-in enables the to create a geographic drive (G-drive) during step 12 of FIG. 4 by creating a G-drive mapping file 141 of FIG. 3 under the directory the user selected as illustrated in more detail with reference to FIG. 7. During step 13 of FIG. 4, the mobile user names the G-drive for the selected directory, for example "home," "AOL hotspot WLAN," or "Starbucks hotspot WLAN." The "home" G-drive can be mapped to the user's home computer, which could be connected via DSL to Verizon DSL service. The AOL hotspot WLAN G-drive could be mapped to a travel schedule of a California trip including flights and flight dates, and the Starbucks hotspot WLAN could be mapped to a hotspot around home where the user spends time. In mapping the G-drive, the user enters, an access network identity, a user account ID, and a password for the named G-drive during step 14 of FIG. 4. During step 15, the user can also enter a location description implying an access point, either a fixed access point such as the Princeton Starbucks or the home computer, or enters a travel plan with itinerary information (e.g., a flight trip, for example). Such itinerary information (travel plans) defines one or more dynamic access points, because each such dynamic access point must be established based on time and the travel plan. The G-drive mapping file 144 of FIG. 3 is created and saved during step 16 of FIG. 4, by the plug-in program to define the G-drive dynamically or to establish a separate program that defines the G-drive before hand.

Figure 5:
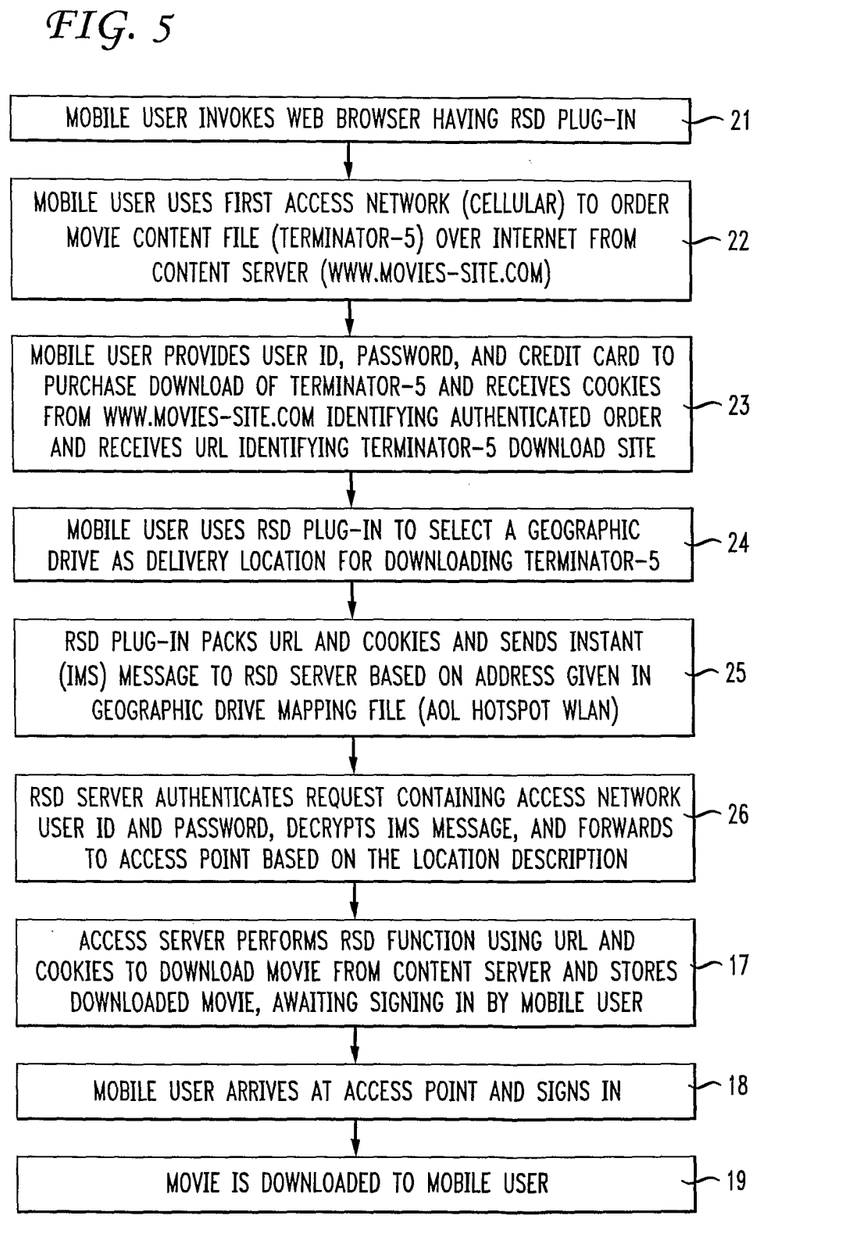
FIG. 5 illustrates in flow chart form a method according to the invention wherein a mobile user purchases content from a web site and selects an option to download the content to a G-drive.

FIG. 5 depicts in flow chart form, the steps of a method wherein the user selects content for downloading to the G-drive mapped during the process of FIG. 4. The method commences with the user invoking the web brower having the special RSD plug-in of the invention during step 21 of FIG. 5. Thereafter, the user accesses the content server 155 of FIG. 2 through the cellular access network 152 and the Internet 153 (both of FIG. 2) to select a movie, e.g., Terminator-5 during step 22 of FIG. 5. Next, during step 23, the user provides authentication information, including user ID, password, and a credit card number to complete the purchase of a download of Terminator-5. During step 23 of FIG. 5, cookies are received and a URL linking to the content file. Terminator-5, is also received by the mobile user. The cookies and URL are automatically saved to the memory in the mobile device 151 of FIGS. 2 and 3.

Figure 8:
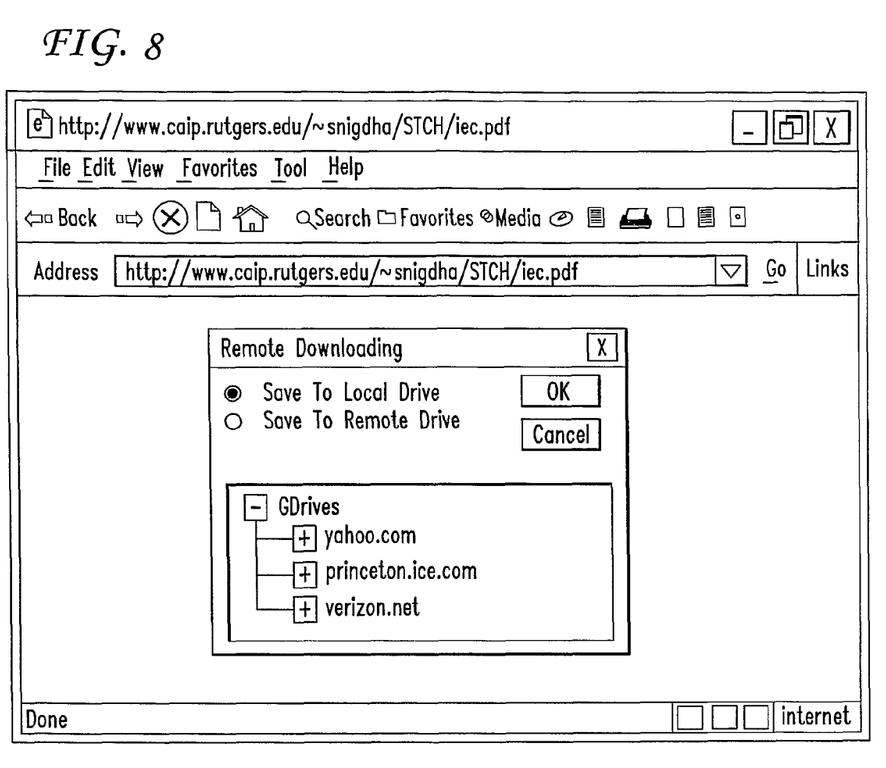
FIG. 8 illustrates a screen print generated by a plug-in program in a web browser, wherein a selectable remote downloading option is provided.
Figure 9:
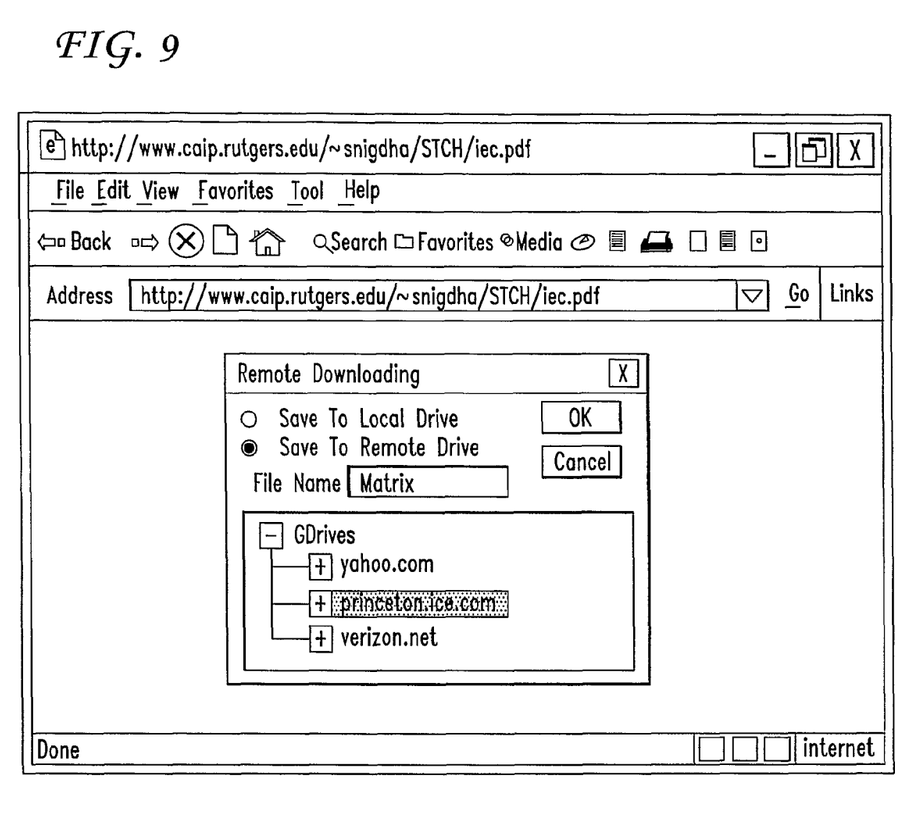
FIG. 9 illustrates a screen print generated by a plug-in program in a web browser wherein remote downloading has been selected and a G-drive has been selected.
Figure 10:
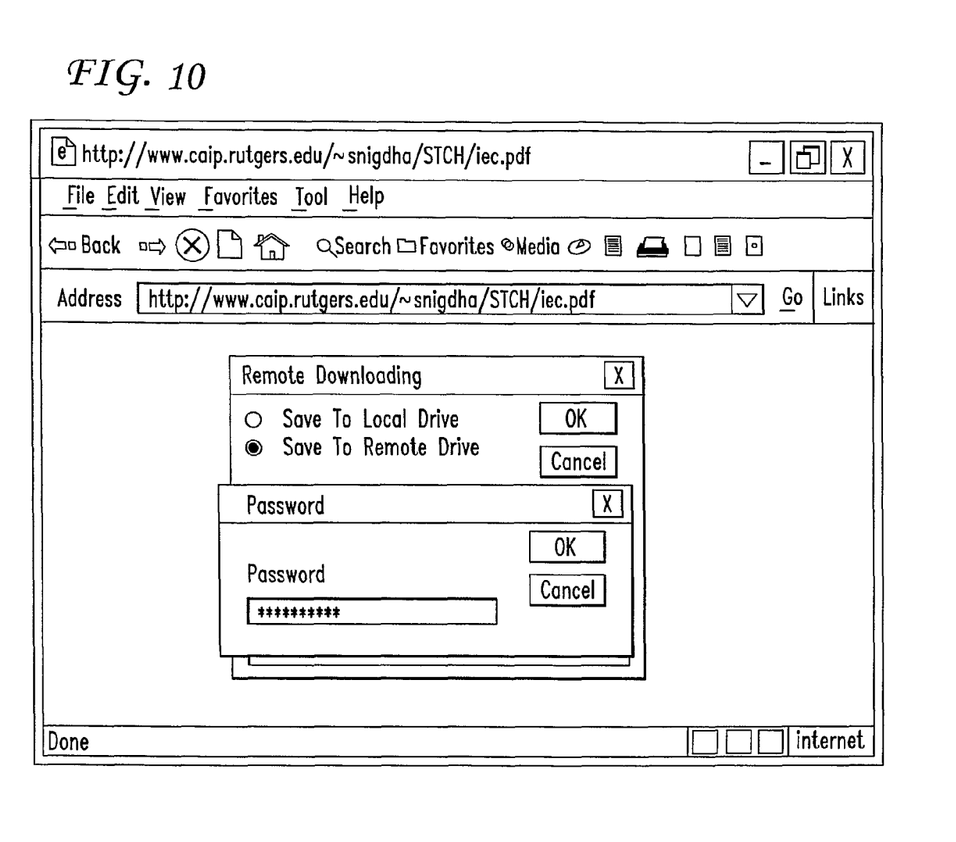
FIG. 10 illustrates a screen print generated by a plug-in program where a password is required for downloading to the geographic drive.

During step 24, the user selects, the G-Drive as a delivery location for downloading the requested movie (Terminator-5). (Note that the user could select the G drive in advance of selecting the content.) Referring to FIG. 8, the plug-in program invoked during step 21 of FIG. 5 provides an option for the mobile device 151 of FIGS. 2 and 3 to save the file to its local drive. As seen in FIG. 9, the user can select the option to save the content to remote G-drive. When selecting the option to save to the G drive, a listing of the available G-drives appears, thus allowing the user to select the desired drive. In FIG. 9, the file name is Matrix and the G-drive is called Princetontce.com, which stands for this user's work computer. The plug-in program may request a password as illustrated in FIG. 10.

Referring again to FIG. 5, the RSD plug-in program then packs the URL, cookies, and other information and sends it by instant messenger service (IMS) to an RSD server during step 25 based on the address given in the selected geographic drive mapping file. Step 25 of FIG. 5 indicates the AOL hotspot WLAN as the G-drive rather than the work computer G-drive illustrated in FIG. 9. Next, during step 26, the RSD server 155 of FIG. 3 receives and decrypts the message sent by IMS and authenticates the request with the provided userID and password. Also during step 26, the RDS server 155 of FIG. 3 forwards downloading instructions to a cache server close to the particular remote access point 156 of FIG. 3 specified by the location description. The location description "Hotspot #555-1212" was either identified in the G-drive mapping file, or was dynamically selected by the system of the invention based on the time and travel plan data previously entered by the user.

During step 27 of FIG. 5, the cache server at the hotspot performs the RSD function using the URL and cookies to download the selected Terminator-5 content file from the content server 154 of FIG. 2 and stores the movie content file to await signing in by the mobile device 151 at the hotspot. During step 28 of FIG. 5, the mobile device 151 arrives at the access point 156 of FIG. 3 and signs in. Then, during step 29, the movie is downloaded locally over a local wireless network (not the cellular network).

Figure 6:
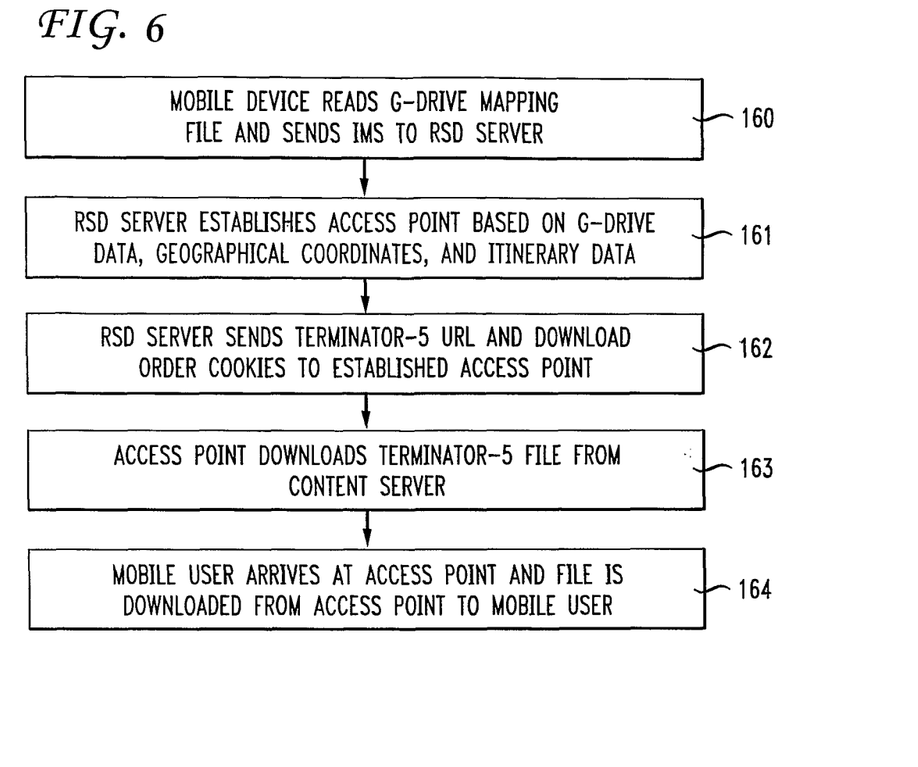
FIG. 6 illustrates in flow chart form a process wherein the RSD server determines the access point based on the G-drive mapping file, sends information to the access point, the access point downloading the content file, and the mobile user arriving at the access point and receiving the downloaded file locally at the access point.

FIG. 6 depicts in flow chart form the steps of a method by which the RDS server 155 of FIG. 3 dynamically establishes the access point. The method commences upon execution of step 160 of FIG. 6, whereupon the mobile device 151 of FIGS. 2 and 3 reads the G-drive mapping file 141 of FIG. 2 and sends a message, typically via Instant Messenger Service (IMS) to the RSD server 155 of FIG. 3. Next, during step 161 of FIG. 6, the RSD server 155 establishes the access point, based on G-drive data, geographical coordinates, and user itinerary information, including, but not limited to flight data. The RSD server 155 then sends the URL of the requested content (e.g., the movie Terminator 5) and download order cookies to the established access point during step 162 of FIG. 6. The access point now downloads the movie Terminator 5 from the content server 154 of FIG. 2 during step 163 of FIG. 6. Upon arrival at the access point, the mobile device 151 of FIGS. 2 and 3 downloads the movie during step 164 of FIG. 6.

Figure 7:
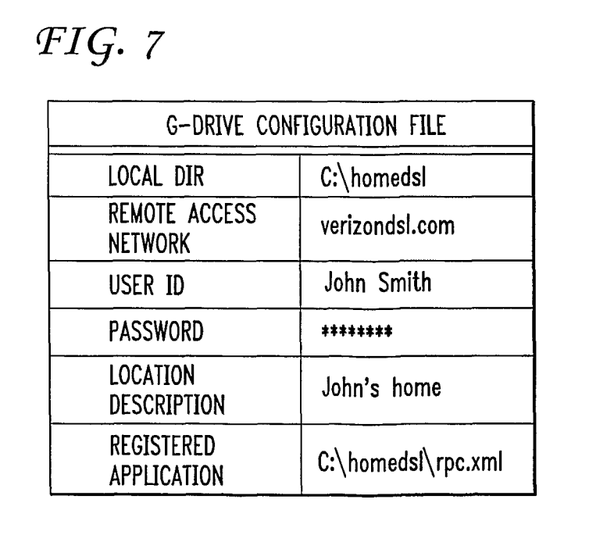
FIG. 7 illustrates a G-drive map file.

FIG. 7 illustrates a map table where the local drive is the user's home C drive, C:\homedsl, the remote site address, user ID, password, remote service interface type, remote site program, and remote site parameter file data are all entered in the map table.

Thus the invention defines a generic concept of remote site downloading (RSD) and proposes a solution that works for generic web applications. The solution allows the mobile user, when ordering a digital content on any web service, to seamlessly download the content to a designated remote side. The solution requires only special client side (content requester and consumer) software (as a web browser plug-in) without requiring any changes on the server side. Thus it can be easily implemented as a service for access network providers.

A mobile user has many reasons to request a downloading to a remote site. The most convincing reason is that when the user makes an order of a digital content, the user may be using an expensive cellular mobile service. If the content is a big file, the user may want it to be delivered to a remote location where less expensive wired/wireless access is available so that the user may later get the content at the remote location at lower cost. Another reason may be that the user simply doesn't have enough time to keep the connection to the content server. The user may want to assign the downloading, most probably a time consuming process, to be handled by an always on (connected) computer. Basically, the user requests a digital content at one location through a GUI (web browser) but the content is downloaded to another location automatically without a GUI.

Usually, to purchase a digital content, a user is using a web browser on a secured session. The user is logged into his or her account and agrees to pay for the downloading of content. Therefore, it is possible for the web server to use session control to secure a downloading is legitimate. For example, it may require cookies for the content. Only if the right cookie is sent back is the content accessible.

This invention uses session transfer and geographic drive techniques to deal with above two issues. A simple, seamless solution is proposed for generic web applications. The G-drive map provides the necessary information for remote site downloading with where to go (the address, userID/password, location description) and how to go (the assignment command).

With session transfer and geographic drive techniques, RSD can be implemented as a web browser plug-in on local machine and a mobile proxy on remote machine. The RSD procedure can be described as follows:

A user is on a web session with a web server and makes a downloading request by clicking on a URL. If the URL has an extension associated with the RSD plug-in, the RSD plug-in is invoked. The RSD plug-in will ask where the user wants to save the file. If the user specifies a location that has a geographic drive mapping, the RSD plug-in will ask the user to confirm a remote site downloading. The information in the mapping file can help the user make the decision. If the user confirms a saving on a geographic drive, the RSD plug-in will pack the information containing (1) user ID/password to access the remote site network, (2) URL of the file to be downloaded and cookies to access the file. The RSD plug-in will execute the RSD assignment command to send packed information to remote site. This can be done in various ways, e.g. through instant messages, or HTTP requests.

If the user specifies a local drive in response to the GUI illustrated in FIG. 8, the RSD plug-in will just start normal downloading and save the file to the local storage.

On the remote site, the RSD proxy will handle the information received, download the content using the URL and the cookies contained in the RSD message and store the content in a specific directory according to the userID of the geographic drive. The content file can be either rendered on the remote machine directly, in the case of a home network, or later downloaded (sync) to the user's mobile device, in the case of a hotspot network.

A mobile user is assumed to be capable of accessing multiple networks such as cellular, public hotspot WLAN and horn e broadband networks. Suppose the user is on a business trip to Europe. On the way to the airport, the user accesses a movie content server and orders a movie for his flight using the cellular mobile network. When arriving at the airport, the user downloads the movie from the local WLAN to a laptop computer at a higher than real-time playback speed. After viewing the movie on the plane, the user can decide to purchase a high definition (HD) copy for his home theater. The user can access cellular connection while in Europe to order an HD version of the movie to be de livered to his/her home in the U.S. The movie will be downloaded into the user's home computer connected to the broadband network and will be available before he or she is back home.

This scenario shows that the added flexibility on consuming time can save a user's waiting time for downloading content. In the example, the content can be further downloaded to a mobile device at a hotspot, or can be directly played back at home. In both cases, a remote site downloading function is performed, i.e., the movie content is requested at a local access network but downloaded to a remote access network for a future use.

A geographic drive can provide a uniform interface for remote site downloading functions of different remote access networks. The idea of geographic drive (G-drive) is to label a storage space on a remote access network with a local file system symbol so a user can select a place to download content in a remote access network through local file system operations. A G-drive is defined as a new type of file system that can be accessed only through its associated access network. A mobile user can configure one G-drive for each of the access networks that he or she subscribes to. For examples, he or she can configure a G-drive labeled C:\homedsl\ as a storage space on his home computer through DSL connection; he or she can also configure a G-drive labeled H:\ as a local storage space on his laptop computer but accessible only through a public wireless LAN provided by AOL. When he or she wants to use a particular access network to download content, he or she just needs to select the associated G-drive to save the content. If the computer that hosts the storage space referred to by the G-drive is currently connected to the access network, a normal operation is granted, otherwise the write operation is deferred until the computer is connected. The G-drive technique can be implemented through a system or application program that can enforce the read/write operations to be made through the associated remote access network. We call this program a G-drive module. Ideally, a G-drive module should be implemented in the operating system (OS) kernel, similar to the implementation of network drives. In this case, read/write operations on a G-drive are checked by the OS file system, which can be applied to any applications transparently. A simple implementation without the OS support is to have a plug-in program in a web browser as the G-drive module. In this case, a configuration file is created under each G-drive directory, including associated network information and user subscription information as shown in Table I. When multimedia content is to be downloaded through a web browser, the plug-in program will be invoked. The program will first ask if the mobile user wants to save the downloading content into a G-drive. If not, normal operations are carried on. Otherwise, it reads the configuration file under the G-drive directory and invokes a registered application specified in the configuration file.

A plug-in implementation of G-drive is preferred, rather than other software programming, because of the universal use of web browsers to obtain content from content providers.

In a web browser, session control is made by using cookies, which are parameters stored by a web browser for each website. Cookies are sets of data containing information about a web session and often comprise authentication information, authorization information, and/or session duration information. By transferring the cookies, the web session can, in effect, be transferred. A web server authorizes a client action by checking the validity of the cookies using the HTTP protocol. As long as the client side gives the valid cookies in the HTTP header, a protected transaction can be authorized. When the plug-in program packs the IMS message, it also includes the cookies in the RSD parameter file. The cookies can be used on the remote site in order to authorize a content downloading.

In the procedure of invoking a remote site program, a mobile user's account information has to be released on the remote site. There are two accounts, the first is the remote access network account and the second is the content service account.

The first account is used for a mobile user to authenticate himself/herself on a remote access network and to be authorized to invoke a remote site program. In order to protect the user account information, preferably the RSD server on the remote site is authenticated. This can be done by encrypting the IMS message with the public key of the remote access network. Only the true access network provider can see the inside of the IMS message. In addition, the password of the user account is preferably not be stored statically in the G-drive mapping file. The password may be dynamically requested when the G-drive is accessed or pre-stored in a machine specific secret place that can only be retrieved by the plug-in program for the remote site downloading service.

The second account is used for the mobile user to order a content from a content server. The cookies for the session of purchase should preferably be transferred to the remote site in order to perform a download with authorization. Although the RSD server is authenticated by the mobile user, the user may still not want the user's private account for content services to be released to an access network provider. This requires that cookies should not be stored in clear text and should be used only by the RSD program. Further, the cookies should be discarded whenever the downloading is finished.

A trusted remote access network is needed for a mobile user to keep the user's private information from being released to third parties. Since the RSD program is provided by the cache server in the remote site access network, it may not be possible to protect the user account from an untrusted access network provider.

In some embodiements a mobile proxy, i.e., a secure object created at the local access network and transferred to the remote access network through, for example, IMS. The mobile proxy has executable methods that can perform content downloading on the cache server of the remote access network. The mobile proxy must be authenticated and then the methods can be authorized to be executed on the remote site. In this case, the user account information of content services can be hidden inside the mobile proxy object without being released to the access network provider. The restrictions must be applied to the executables of the mobile proxy, such as the accessible memory and disk locations. This approach is safer for mobile users but potentially dangerous for remote access networks.

An advantage of the invention is that no system interworking is required between local and remote access networks. An access network can accept a remote site downloading request purely based on the mobile user's subscription status, regardless where the request comes from.

As mentioned, on the content requester (CR), special software such as a web browser plug-in program, is preferably installed for the RSD service. The plug-in program can be defined as a RSD client, which performs the following tasks: (1) finds a remote access network based on the G-drive mapping file, (2) creates an IMS message containing remote access network account information and content purchase information (cookies and URL) and (3) sends the IMS message to invoke a downloading service on the remote site. G-drive mapping must be pre-established. A travel plan may be included in the G-drive map file for a mobile user, and the system can use the travel plan data to determine the detailed location of the content consumer (CC).

In case the remote access network is a wired network, a cache server is not required to perform the RSD service. The content consumer (CC) can directly take the IMS message from the RSD server for invoking downloading service. On the CC, there must be a RSD program that downloads a content based on the cookies and the URL given in the IMS message.

In case the remote access network is a wireless network at a hotspot, the cache server (ES) will perform the downloading service on behalf of the content consumer. On the ES, in addition to the RSD program for downloading, there must be an account manager program that can store the content for a corresponding CC and synchronizes the content when the CC is connected.

On the RS, there is preferably a program that can de-multiplex the IMS messages to the right cache server or CC device (in case of a fixed CC) based on the location information provided in the IMS message.

In another embodiment, a CR makes a content order on a CS through the local access network. When the CR decides to save the content on a G-drive for a remote access network, an RSD client (plug-in) program is invoked by the web browser. The RSD client program will create an IMS message containing (1) the URL and the cookies for the content, (2) the user ID/password for the remote access network, (3) the location information based on the travel plan and (4) the name of the RSD function (or the RSD function itself in case of the mobile proxy solution). The IMS message is sent to an RSD server based on the address given in the G-drive mapping file. The message is encrypted by the RSD server's public key. The RSD server will decrypt the IMS message and forward it to an edge (cache) server or directly to a CC device according to the location information given in the message. The ES will perform the RSD function with the cookies and the URL given in the message. The ES will send a notification when the RSD service is completed and perform synchronization when the CC device is connected.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A method for remote side downloading (RSD) comprising:
   establishing a session between a local computer and a content server having a resource locator;
   selecting a content file to be downloaded from the content server;
   selecting a remote site geographic drive to which the content file is to be downloaded from the content server, wherein the remote site geographic drive is identified based on information in a mapping file stored in the local computer;
   wherein the mapping file comprises travel plan data for use in establishing one or more dynamic access points for accessing the downloaded content file;
   receiving at least one message of the session from the content server;
   packing information comprising the message of the session and the resource locator;
   sending the packed information to a remote site computer from the local computer;
   wherein the resource locator and the at least one message comprised in the packed information are for respectively accessing the content server and for authenticating the session between the local computer and the content server by the remote site computer so as to download the selected content file to the selected remote site geographic drive, and wherein at least the local computer is located remote from the remote site computer at least during establishment of the session.

2. The method of claim 1 wherein the local computer has a RSD program configured to pack the information and send the information to a remote site computer.

3. The method of claim 2 wherein the RSD program is a plug-in in a web browser.

4. The method of claim 1 wherein the message of the session includes data comprising information selected from the group consisting of authentication information, authorization information, and session duration information.

5. The method of claim 1 wherein the session is a web session.

6. The method of claim 1 wherein the message of the session is a web browser cookie.

7. The method of claim 1 wherein the content file is represented by the resource locator, which is included in the packed information and identifies the selected content file for the remote site computer.

8. The method of claim 1 wherein the local computer establishes the session via a first access network and the remote site computer downloads the content file via a second access network.

9. The method of claim 1 wherein the geographic drive is at a fixed location.

10. The method of claim 1 wherein the geographic drive is at a dynamic location.

11. The method of claim 1 wherein the geographic drive is at a hotspot.

12. The method of claim 1 wherein the remote site computer downloads the file from the content server using the resource locator and the message of the session to store the content file in a cache server until the computer associated with the geographic drive is available to receive the content file from the cache server.

13. The method of claim 1 wherein the remote site computer has an RSD server program to download the file from the content server using the resource locator and message of the session or assigns a cache server to download the file from the content server and store the file until the computer associated with the geographic drive is available to receive the content file from the cache server.

14. The method of claim 1 wherein the geographic drive is a mobile computer and the remote site computer is a cache server at a hotspot, and the cache server has an RSD server program that receives the packed information, downloads the selected content file from the content server using resource locator and message of the session, stores the content file until the mobile computer signs in at the hotspot and then downloads the content file from the cache server to the mobile computer geographic drive.

15. The method of claim 1 wherein the session between the local computer and the content server is a secured session and the content file is purchased using a credit card, wherein the content server uses the message of the session to assure that the downloading request is authentic.

16. The method of claim 1 wherein the mapping file contains data comprising one or more of a name of an associated network, a user ID of the associated access network, a password of the associated access network, a geographical location of a static location or a dynamic hotspot location, and an RSD assignment command comprising executables and parameters to be made when the geographic drive is accessed.

17. The method of claim 1 wherein the local computer uses a web browser with an RSD plug-in to establish the session with the content server.

18. The method of claim 1 wherein the content file is a multimedia file.

19. The method of claim 1 wherein the content file is a movie file.

20. The method of claim 1 wherein the packed information is sent to the remote site computer as an instant message, an e-mail with an attachment comprising the packed information, or an HTTP request.

21. A system for remote site downloading (RSD) comprising a local computer configured for establishing a session with a content server, selecting a content file to be downloaded from the content server, selecting a geographic drive to which the content file is to be downloaded from the content server, wherein the remote site geographic drive is identified based on information in a mapping file stored in the local computer; wherein the mapping file comprises travel plan data for use in establishing one or more dynamic access points for accessing the downloaded content file; receiving at least one message of the session from the content server, packing information comprising the at least one session message and the resource locator, and sending the packed information to a remote site computer for accessing the content server by the remote site computer using the resource locator and for authentication of the session between the local computer and the content server by the remote site computer using the message so as to download the selected content file to the geographic drive, and wherein the local computer is located remote from at least the remote site computer during establishment of the session.

22. The system of claim 21 wherein the local computer has a web browser with an RSD plug-in.

23. The system of claim 21 wherein the local computer is a mobile device and the remote site computer has a broadband connection, wherein the broadband connection is wireless or wired.

24. A system for facilitating remote site downloading (RSD) of a content file selected using a first computer from a content web server for downloading to a remote computer geographic drive comprising:

the first computer comprising a browser RSD plug-in which enables identification, by a mapping file stored in the first computer, of the remote computer geographic drive for receiving and storing the selected content file, packs information comprising a cookie, and sends the packed information comprising the cookie to a remote computer, wherein the mapping file comprises travel plan data for use in establishing one or more dynamic access points for accessing the downloaded content file, the packed information comprising the cookie functioning to authenticate a prior session between the first computer and the content web server during which the content file was selected and to cause the remote computer to automatically request the content web server to download the content file to the remote computer geographic drive, wherein at least the computer-based storage location is located remote from the first computer at least during establishment of the prior session.

* * * * *